United States Patent
Yip et al.

(10) Patent No.: US 11,381,621 B2
(45) Date of Patent: Jul. 5, 2022

(54) DEVICE AND METHOD FOR PROCESSING DATA IN MULTIMEDIA SYSTEM

(71) Applicant: Samsung Electronics Co., Ltd., Suwon-si (KR)

(72) Inventors: Eric Yip, Suwon-si (KR); Jaehyeon Bae, Suwon-si (KR); Youngwan So, Suwon-si (KR); Hyunkoo Yang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/041,225

(22) PCT Filed: Apr. 11, 2019

(86) PCT No.: PCT/KR2019/004389
§ 371 (c)(1),
(2) Date: Sep. 24, 2020

(87) PCT Pub. No.: WO2019/199092
PCT Pub. Date: Oct. 17, 2019

(65) Prior Publication Data
US 2021/0014293 A1    Jan. 14, 2021

Related U.S. Application Data

(60) Provisional application No. 62/655,987, filed on Apr. 11, 2018.

(51) Int. Cl.
*H04L 29/06* (2006.01)
*H04L 29/08* (2006.01)
(Continued)

(52) U.S. Cl.
CPC .............. *H04L 65/601* (2013.01); *G06T 9/00* (2013.01); *H04L 67/10* (2013.01)

(58) Field of Classification Search
CPC .......... H04L 65/601; H04L 67/10; G06T 9/00
(Continued)

(56) References Cited

U.S. PATENT DOCUMENTS

| 9,787,321 B1 | 10/2017 | Hemmer et al. |
| 2014/0086333 A1 | 3/2014 | Wang |

(Continued)

FOREIGN PATENT DOCUMENTS

| KR | 10-2015-0063456 A | 6/2015 | |
| KR | 20150063456 A * | 6/2015 | ........... H04N 21/435 |
| KR | 10-2019-0088841 A | 7/2019 | |

OTHER PUBLICATIONS

Y.-K. Wang et al., "RTP Payload Format for High Efficiency Video Coding (HEVC),"2016, Internet Engineering Task Force (IETF), https://datatracker.ietf.org/doc/html/rfc7798 (Year: 2016).*

(Continued)

*Primary Examiner* — Ruolei Zong
(74) *Attorney, Agent, or Firm* — Jefferson IP Law, LLP

(57) ABSTRACT

Various embodiments of the present disclosure relate to a device and a method for processing point cloud data on the basis of PCC technology in a multimedia system. To this end, a bit stream according to point cloud compression may be generated, and the bit stream may be divided to generate access units by a plurality of type-specific data elements. The plurality of data elements may include at least one layer-specific shape data, at least one layer-specific texture data, auxiliary patch information, and occupancy information. The size of each of the plurality of access units may match a maximum transmission unit in a network.

14 Claims, 3 Drawing Sheets

(51) Int. Cl.
  *G06T 9/00* (2006.01)
  *H04L 65/60* (2022.01)
  *H04L 67/10* (2022.01)

(58) Field of Classification Search
  USPC ............................................................ 709/201
  See application file for complete search history.

(56) References Cited

U.S. PATENT DOCUMENTS

| | | | |
|---|---|---|---|
| 2014/0086337 A1* | 3/2014 | Wang | H04N 19/50 |
| | | | 375/240.26 |
| 2014/0241439 A1* | 8/2014 | Samuelsson | H04N 19/70 |
| | | | 375/240.26 |
| 2016/0086353 A1 | 3/2016 | Lukac et al. | |
| 2017/0347122 A1* | 11/2017 | Chou | H04N 19/36 |
| 2019/0238855 A1* | 8/2019 | Kusakabe | H04N 19/188 |
| 2021/0006806 A1* | 1/2021 | Schwarz | H04N 19/597 |

OTHER PUBLICATIONS

Karthik Ainala, "Point Cloud Compression and Low Latency Streaming," 2017, University of Missouri—Kansas City, https://mospace.umsystem.edu/xmlui/bitstream/handle/10355/63254/Thesis_2017_Ainala.pdf?sequence=1&isAllowed=y (Year: 2017).*

Kiran Misra et al., "An Overview of Tiles in HEVC," 2013, IEEE, IEEE Journal of Selected Topics in Signal Processing ( vol. 7, Issue: 6, Dec. 2013), https://ieeexplore.ieee.org/document/6547985 (Year: 2013).*

3DG; PCC Test Model Category 2 vO; International Organisation for Standardisation; Organisation Internationale De Normalisation; ISO/IEC JTC1/SC29AVG11; Coding of Moving Pictures and Audio; XP 030023909; ISO/IEC JTC1/SC29/WG11 N17248; Oct. 2017; Macau, China.

European Search Report dated Dec. 9, 2020; European Appln. No. 19785163.7-1209 PCT/KR2019004389.

Preda; Point Cloud Compression in MPEG; MP20 Workshop; Insistut Mines Telecom, France; Oct. 2017; Hong-Kong.

MPEG; Convenor of MPEG; Point Cloud Compression—MPEG evaluates responses to call for proposal and kicks off its technical work; International Organization for Standardization Organisation Internationale De Normalisation ISO/IEC/JTC 1/SC 29/WG 11; Coding of Moving Pictures and Audio; ISO/IEC JTC 1/SC 29/WG 11 N17102; Oct. 2017; Macau, China.

* cited by examiner

DEVICE AND METHOD FOR PROCESSING DATA IN MULTIMEDIA SYSTEM

CROSS-REFERENCE TO RELATED APPLICATION(S)

This application is a National Phase Entry of PCT International Application No. PCT/KR2019/004389, which was filed on Apr. 11, 2019, and claims priority to U.S. provisional Application No. 62/655,987, which was filed on Apr. 11, 2018, the contents of which are incorporated herein by reference.

TECHNICAL FIELD

Various embodiments of the present disclosure relate to an apparatus and method for processing data for an immersive media service based on a point cloud in a multimedia system.

BACKGROUND ART

Multimedia technologies have evolved to support high-quality and realistic services. A virtual reality (VR)/augmented reality (AR) service using an immersive media (audio/video) technique may be a representative example of the multimedia technologies.

The immersive media technique requires a compression technique for providing high-quality standard dynamic range (SDR)/high dynamic rage (SDR)/high dynamic range (HDR)/360-degree image compression solution and a transmission technique for providing an effective function of the immersive media. In particular, a point cloud compression (PCC) technique has been considered as a compression technique for implementing contents for the immersive media service. The PCC technique is a technique for producing, compressing, and transmitting omnidirectional) (360°) video contents as immersive contents through a point cloud. That is, the PCC technique is a method for presenting a three-dimensional (3D) image having information about a color of the image and information about coordinates in a space, and this PCC technique may be used to support the next 6DoF and Mixture VR service.

DETAILED DESCRIPTION OF THE INVENTION

Technical Problem

General image compression techniques (Moving Picture Experts Group (MPEG), etc.,) have developed a point cloud compression solution that permits a significant reduction in point cloud data and enables real-time streaming of point cloud data to consume contents in another device. In particular, a transmedia content type 2 (TMC2) has been designed, taking account of a dynamic point cloud application such as capturing or sharing of a point cloud via a network, for remote rendering.

The TMC2 has a code layer tool for achieving a noticeable compression rate. However, an appropriate system layer tool capable of being integrated into a streaming or sharing application program via the network is insufficient.

Therefore, there is a need for a scheme to enable streaming and real-time applications program to use PCC via the network.

According to an embodiment of the present disclosure, there is provided an apparatus and method for processing point cloud data based on a PCC technique in a multimedia system.

According to another embodiment of the present disclosure, there is also provided an apparatus and method for generating access units (AUs) based on a plurality of type-specific data components constituting point cloud data by using a PCC technique in a multimedia system.

Technical Solution

A method for processing point cloud data in an electronic device according to various embodiments of the present disclosure includes generating a bitstream corresponding to point cloud compression (PCC) and generating a plurality of access units (AUs) based on a plurality of type-specific data components by dividing the bitstream, in which the plurality of data components include at least one layer-specific geometry data, at least one layer-specific texture data, auxiliary patch information, and occupancy (map) information, and a size of each of the plurality of AUs matches a maximum transmission unit (MTU) in a network.

An electronic device for processing point cloud data according to various embodiments of the present disclosure includes a transceiver configured to communicate with a network and at least one processor connected to the transceiver, in which the at least one processor is configured to generate a bitstream corresponding to point cloud compression (PCC) and to generate a plurality of access units (AUs) based on a plurality of type-specific data components by dividing the bitstream, and in which the plurality of data components include at least one layer-specific geometry data, at least one layer-specific texture data, auxiliary patch information, and occupancy (map) information, and a size of each of the plurality of AUs matches a maximum transmission unit (MTU) in a network.

MODE FOR CARRYING OUT THE INVENTION

Figure 1:
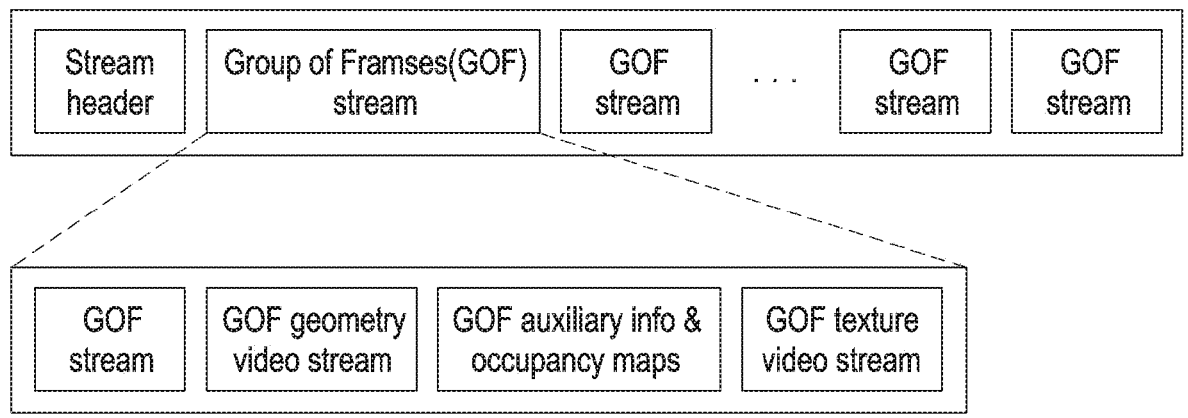
FIG. 1 illustrates an example of a point cloud compression (PCC) bitstream according to various embodiments proposed in the present disclosure.

Hereinafter, various embodiments of the present disclosure will be disclosed with reference to the accompanying drawings. However, the description is not intended to limit the present disclosure to particular embodiments, and it should be construed as including various modifications, equivalents, and/or alternatives according to the embodiments of the present disclosure. With regard to the description of the drawings, similar reference numerals may be used to refer to similar or related elements.

In the present disclosure, an expression such as "having," or "may have," or "comprising," or "may comprise" indicates existence of a corresponding characteristic (e.g., a numerical value, a function, an operation, or an element like a part) and does not exclude existence of additional characteristic.

In the present disclosure, an expression such as "A or B," "at least one of A or/and B," or "one or more of A or/and B" may include all possible combinations of together listed items. For example, "A or B," "at least one of A and B," or "one or more of A or B" may indicate the entire of (1) including at least one A, (2) including at least one B, or (3) including both at least one A and at least one B.

Expressions such as "first," "second," "primarily," or "secondary," used in various embodiments may represent various elements regardless of order and/or importance and do not limit corresponding elements. The expressions may be used for distinguishing one element from another element. For example, a first user device and a second user device may represent different user devices regardless of order or importance. For example, a first element may be named as a second element without departing from the right scope of the various exemplary embodiments of the present disclosure, and similarly, a second element may be named as a first element.

When it is described that an element (such as a first element) is "operatively or communicatively coupled with/to" or "connected" to another element (such as a second element), the element can be directly connected to the other element or can be connected to the other element through another element (e.g., a third element). However, when it is described that an element (e.g., a first element) is "directly connected" or "directly coupled" to another element (e.g., a second element), it means that there is no intermediate element (e.g., a third element) between the element and the other element.

An expression "configured (or set) to" used in the present disclosure may be replaced with, for example, "suitable for," "having the capacity to," "designed to," "adapted to," "made to," or "capable of" according to a situation. A term "configured (or set) to" does not always mean only "specifically designed to" by hardware. Alternatively, in some situation, an expression "apparatus configured to" may mean that the apparatus "can" operate together with another apparatus or component. For example, a phrase "a processor configured (or set) to perform A, B, and C" may be a dedicated processor (e.g., an embedded processor) for performing a corresponding operation or a generic-purpose processor (such as a CPU or an application processor) that can perform a corresponding operation by executing at least one software program stored at a memory device.

Terms defined in the present disclosure are used for only describing a specific exemplary embodiment and may not have an intention to limit the scope of other exemplary embodiments. It is to be understood that a singular form of a noun corresponding to an item may include one or more of the things, unless the relevant context clearly indicates otherwise. All of the terms used herein including technical or scientific terms have the same meanings as those generally understood by an ordinary skilled person in the related art. The terms defined in a generally used dictionary should be interpreted as having meanings that are the same as or similar with the contextual meanings of the relevant technology and should not be interpreted as having ideal or exaggerated meanings unless they are clearly defined in the various exemplary embodiments. In some case, terms defined in the present disclosure cannot be analyzed to exclude the present exemplary embodiments.

Hereinafter, various embodiments to be proposed in the present disclosure will be described in detail with reference to the accompanying drawings.

FIG. 1 illustrates an example of a point cloud compression (PCC) bitstream according to various embodiments proposed in the present disclosure.

Referring to FIG. 1, a PCC bitstream may include a stream header and a payload. The payload of the PCC bitstream may include a plurality of groups of frames (GoF) streams.

Each of the plurality of GoF streams may include a GoF header and a type-specific data stream. The type-specific data stream may be one of a GoF geometry video stream, a GoF auxiliary info & occupancy maps information, and a GoF texture video stream. The type-specific data stream may include a plurality of frames. The type-specific data stream may include, for example, thirty frames.

In case of the structure of the bitstream shown in FIG. 1, a random access to single point cloud frames is difficult to perform. At present, a transmedia content type 2 (TMC2) may group data of each frame into a GoF without interleaving.

Thus, color information of all GoFs may be identified after geometry data of all frames and auxiliary information and occupancy (map) information of all the frames are found.

To transmit the PCC bitstream, a transmission device has to generate a GoF first before transmission of the GoF. The structure of the PCC bitstream shown in FIG. 1 may be appropriate for simplification of embedding of a high-efficiency video codec (HEVC) bitstream.

The following list describes required improvements for current HLS for the PCC.

Packaging to smaller packets suitable for PMTU size is not supported.
Resynchronization is permitted only in GoF boundaries.
Spatial random access for bitstream is not supported.
Adaptation to case requiring thinning for bitstream to achieve target bit transmission rate is not supported.
Flexible interleaving of point cloud data components in single bitstream is not supported.

Figure 2:
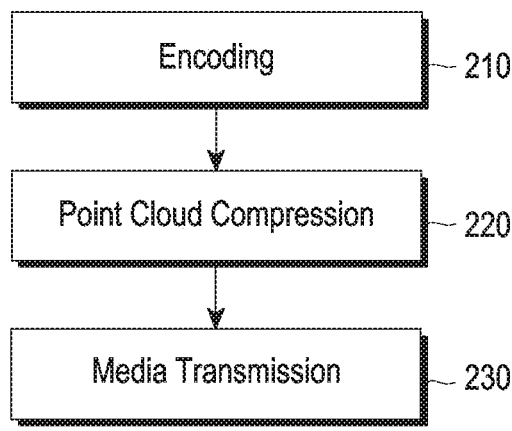
FIG. 2 illustrates a procedure performed by an electronic device to support a PCC technique, according to various embodiments proposed in the present disclosure.

FIG. 2 illustrates a procedure performed by an electronic device to support a PCC technique, according to various embodiments proposed in the present disclosure. The electronic device may be a device capable of producing, compressing, and transmitting omnidirectional) (360°) video contents as immersive contents through a point cloud.

Referring to FIG. 2, the electronic device may perform encoding on type-specific data components to support a point cloud in operation 210. The type of the data component may be defined, for example, as below.

Geometry data for each of at least one layer→D0, D1
Texture data for each of at least one layer→T0, T1
Auxiliary patch information
Occupancy(map) information Herein, D0 indicates geometry data in a first layer, and D1 indicates geometry data in a second layer. T0 indicates texture data in the first layer, and T1 indicates texture data in the second layer. When one layer is used, there may exist geometry data D0 and texture data T0. When two or more layers are used, there may exist geometry data corresponding to the number of layers and texture data. The auxiliary patch information may be defined in common for at least one layer-specific geometry data and at least one texture data.

As one example, when two layers are considered, geometry data and texture data may be classified into two sub categories.

D0: generic depth data for geometry
D1: thickness depth data for geometry
T0: generic color data for texture
T1: thickness color data for texture Regardless of whether different point cloud data components of a PCC frame are compressed, transmitted, or the like, one PCC access unit (AU) may include all point cloud data components required for rendering of one PCC frame.

When the electronic device generates data for each type, the electronic device may perform encoding by using a preset encoding scheme for each type of a data component. The encoding scheme may be, for example, a different encoding scheme for each type of a point cloud data component.

For compression of a point cloud data component that may be presented as a video frame, video encoding techniques (audio video coding (AVC), high efficiency video coding (HEVC), VP9, future video encoding scheme, etc.,) may be used. The point cloud data component that may be presented as the video frame may be, for example, geometry data, texture data, etc.

For compression of a point cloud data component that may be regarded as being similar to meta data, an arithmetic coding technique may be used. The point cloud data component that may be regarded as being similar to meta data may be, for example, auxiliary patch information. The arithmetic coding technique may be, for example, an entropy encoding technique.

The electronic device may group particular point cloud data components together for compression. The reasons are as below.

In space and time dependence relationships of a particular point cloud data component, an advantage is higher compression efficiency. For example, replacement frames of D0 and D1 may be compressed in one bitstream, and this may be equally applied to T0 and T1.

Grouping of point cloud data components using the same coding technique for compression may be advantageous to a random access to PCC AUs in terms of encapsulation and carriage.

The electronic device may perform a point cloud compression procedure for carrying data components encoded in operation 220. To carry a PCC bitstream including various data components, the electronic device may decompose bitstreams concatenated for delivery in a packet loss network. In the PCC bitstream, a different type of a point cloud data component may have already been interleaved or not.

According to an embodiment of the present disclosure, the bitstream may be divided into PCC AUs (together with header meta data), each of which has a size equal to a maximum transmission unit (MTU) in a network. A sum of the PCC AUs may form a PCC unit stream capable of presenting a bitstream for carriage.

In this case, a header of each PCC AU may clearly include a description of a divided bitstream carried in the PCC AU. The header of the PCC AU may include, for example, an identifier of a PCC frame to which the PCC AU is applicable and a type of a point cloud data component including sub categories thereof. Herein, the sub categories may include at least one layer-specific geometry data D0 or D1, at least one layer-specific texture data T0 or T1, auxiliary patch information, occupancy (map) information, etc. The identifier of the PCC frame may be, for example, a frame counter. Other information such as coding type information applied to the point cloud data component included in the payload of the PCC AU, one or multiple tool parameters, other setting parameters applicable as meta data to data may also be carried in the PCC AU.

As described above, after the bitstream is divided into PCC interleaving of the PCC AUs may be performed. Data of each PCC AU may be identified based on explicit signaling. That is, data of the PCC AUs may be identified by a component type of data, the number of frames, etc. Thus, the PCC AUs may be changed in an order thereof for transmission. However, when signaling like order designation of a point cloud data component in a PCC bit stream is included in an order of the point cloud data component, reconfiguration of the ACC AU in a reception side may become impossible due to interleaving.

According to another embodiment of the present disclosure, a PCC bitstream may be separated into parallel point cloud data component streams according to various point cloud data components.

A criterion for selecting the parallel point cloud data component streams may be defined as below.

Type of point cloud data unit in PCC bitstream (one point cloud data component stream for each of geometry data (D0 or D0, texture data, auxiliary patch information, and occupancy information)

Type of coding used for compression of data in PCC bitstream (video coding scheme, arithmetic coding scheme, etc.) Herein, the video coding scheme may be AVC, HEVC, VP9, etc., and the arithmetic coding scheme may be an entropy coding scheme.

Combination of type of coding used for data compression and type of point cloud data component (or a sub category thereof)

The electronic device may determine a coding scheme to be used for coding a data component by using an order of AU data components in component streams. The electronic device may further consider whether coding input and output sequences are changed to determine the coding scheme. For this reason, a decoding time stamp for a sample of each component stream may match between parallel component streams, depending on the number of frames of a PCC AU.

The electronic device may configure a stream header of a component stream to include an identifier of data included in each component stream. The electronic device may separately designate meta data for describing information associated with various component streams in a meta data track in which a time to describe a relationship between a PCC header or a component stream sample for each PCC time stamp is designated. The meta data may be information for describing, for example, a relationship between component streams.

In one implementation example, a PCC component stream may be encapsulated as a high-layer ISOBMFF track. The encapsulated high-layer ISOBMFF track may be received by a consumption device that reconfigures a PCC AU by using information (meta data) from a high-level PCC content file box. The encapsulated high-layer ISOBMFF track may include a time meta data track for describing a relationship between parallel component streams (tracks).

Moreover, the header of the PCC stream may include information about a description regarding all settings and tools used for delivery of the divided PCC stream.

The electronic device may perform media transmission based on one of transmission techniques provided for a point cloud service, in operation 230. The transmission techniques may include, for example, dynamic adaptive streaming over HTTP (DASH), Moving Picture Experts Group (MPEG) media transport (MMT), Advanced Television Systems Committee (ATSC), etc.

Figure 3:
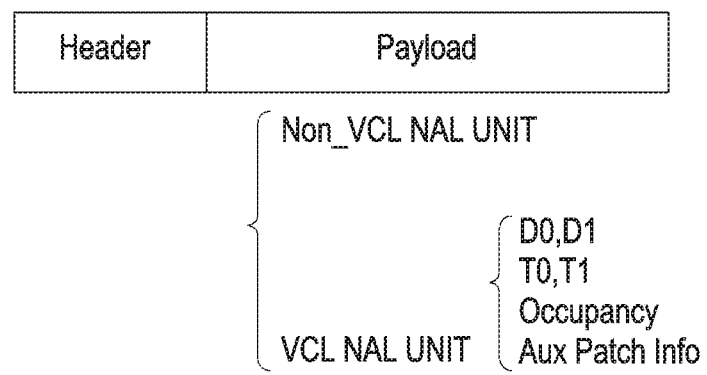
FIG. 3 illustrates a structure of a PCC active unit, according to various embodiments proposed in the present disclosure.

FIG. 3 illustrates a structure of a PCC active unit, according to various embodiments proposed in the present disclosure.

Referring to FIG. 3, a PCC AU may include a header and a payload. The payload may include non-visual coding layer (VCL) network abstraction layer (NAL) unit(s) or VCL NAL unit(s). The VCL NAL unit may be one of at least one layer-specific geometry data D0 and D1, at least one layer-specific texture data T0 and T1, auxiliary patch information, or occupancy (map) information.

According to one embodiment, a PCC AU may include all NAL units constituting a single coded PCC frame. The NAL unit may be divided as below based on a type of included information:

PCC NAL units including HEVC NAL units of a geometry layer;
PCC NAL units including HEVC NAL units of a texture layer;
PCC NAL unit(s) including RLC-coded occupancy (map) information for the current frame;
PCC NAL unit(s) including all associated auxiliary patch related information; and
PCC NAL unit including all AU header information.

When the following conditions are applied, an AU may be regarded as a random AU.

AU may include all AU header information.
geometry data of geometry layer 0 may be coded into an HEVC IDR picture.
texture data of texture layer 0 may be coded into an HEVC IDR picture.
frame counter field may be set to 0.
HEVC slice_pic_order_cnt_lsb may be used to indicate whether an NAL unit belongs to layer 0 or layer 1 of geometry data or texture data.
nu_layer_id may be set to 0 when an embedded NAL unit comes from layer 0 of a texture or geometry structure; nu_layer_id may be set to 1 when the embedded NAL unit comes from layer 1 of the texture or geometry structure.

The foregoing condition may be applied when a picture indicating geometry data of different layers is coded using HEVC with an interleaving scheme. This may be equally applied when texture data of different layers is coded after interleaving.

Figure 4:
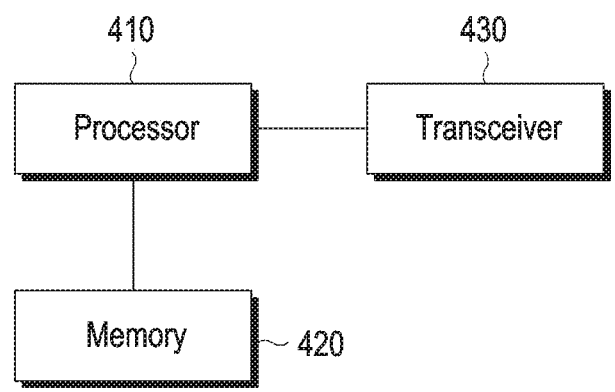
FIG. 4 illustrates a structure of an electronic device to process point cloud data, according to various embodiments proposed in the present disclosure.

FIG. 4 illustrates a structure of an electronic device to process point cloud data, according to various embodiments proposed in the present disclosure.

Referring to FIG. 4, a transceiver 430 may perform communication with a network. At least one processor 410 may be connected with the transceiver to perform overall control for communication with the network.

According to one embodiment, the at least one processor 410 may generate a bitstream corresponding to PCC and divide the bitstream to generate AUs based on a plurality of type-specific data components. The plurality of data components may include at least one layer-specific geometry data, at least one layer-specific texture data, auxiliary patch information, and occupancy information. A size of each of the plurality of AUs may match a maximum transmission unit (MTU) in a network.

A header of each of the plurality of AUs may include type information of a data component included in a payload of the AU and an identifier of a PCC frame to which the AU is applicable. The header may further include information about a coding type applied to the data component included in the payload of the AU and one or a plurality of tool parameters.

Information for driving the at least one processor 410 may be recorded in a memory 420. The memory 420 may store type-specific data components for a point cloud service.

The at least one processor 410 may identify a data component included in the payload of each of the plurality of AUs through explicit signaling. The at least one processor 410 may generate an AU by meta data regarding the plurality of type-specific data components.

Although not shown, an interleaver for interleaving a plurality of active units may be further included.

Figure 5:
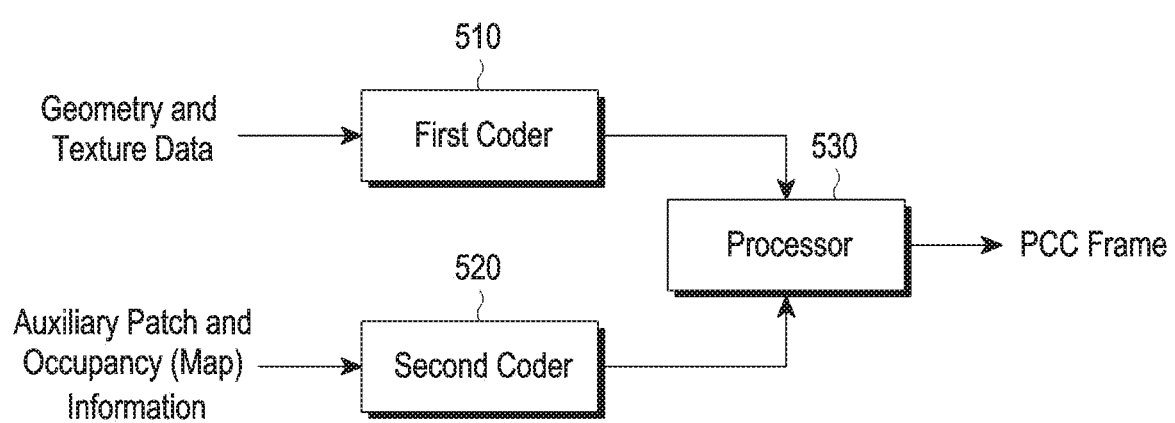
FIG. 5 illustrates a structure of an electronic device to generate an access unit (AU) for a point cloud service, according to various embodiments proposed in the present disclosure.

FIG. 5 illustrates a structure of an electronic device to generate an AU for a point cloud service, according to various embodiments proposed in the present disclosure.

Referring to FIG. 5, a first coder 510 may perform coding on at least one layer-specific geometry data and at least one layer-specific texture data with the at least one layer-specific geometry data and the at least one layer-specific texture data as inputs thereto by using the video coding scheme. A second coder 520 may encode auxiliary patch information by using the arithmetic coding scheme.

A processor 530 may generate and output AUs based on type-specific data components by using compressed geometry data, compressed texture data, and compressed auxiliary patch information that are output by the first coder 510 and compressed auxiliary patch information output by the second coder 520.

According to an embodiment proposed in the present disclosure, a structure of a PCC bitstream may be as below.

The first design selection may be using an NAL-based syntax for a PCC bitstream. In this case, a main component of the PCC bitstream is compressed using HEVC, and thus has already followed the NAL-based syntax. However, to avoid collision with an HEVC bitstream syntax, attention has to be paid. To this end, a structure of an NAL unit that is the same as that defined in HEVC may be used.

A structure of an NAL unit according to an embodiment may be as shown in Table 1.

TABLE 1

| | Descriptor |
|---|---|
| nal_unit( NumBytesInNalUnit ) { | |
|   nal_unit_header( ) | |
|   NumBytesInRbsp = 0 | |
|   for( i = 2; i < NumBytesInNalUnit; i++ ) | |
|     if( i + 2 < NumBytesInNalUnit && next_bits( 24 ) = = 0x000003 ) { | |
|       rbsp_byte[ NumBytesInRbsp++ ] | b(8) |
|       rbsp_byte[ NumBytesInRbsp++ ] | b(8) |
|       i += 2 | |

TABLE 1-continued

| | Descriptor |
|---|---|
| emulation_prevention_three_byte /* equal to 0x03 */ | f(8) |
| } else | |
| rbsp_byte[ NumBytesInRbsp++ ] | b(8) |
| } | |

Table 2 defines an example of a header structure of an NAL unit.

TABLE 2

| | Descriptor |
|---|---|
| nal_unit_header( ) { | |
| forbidden_zero_bit | f(1) |
| nal_unit_type | u(6) |
| nuh_layer_id | u(6) |
| nuh_temporal_id_plus1 | u(3) |
| } | |

In a header structure defined in Table 2, nal_unit_type indicates a field reserved for PCC. For PCC, nal_unit_type may be 63.

The PCC bitstream may include a plurality of HEVC bitstreams, and thus has to be encapsulated in the unit of a PCC NAL. Without encapsulation, the PCC bitstream may seem to follow HEVC, but when the PCC bitstream meets an NAL of another bitstream, HEVC decoding may completely fail.

An NAL unit header may be extended for encapsulation. nal_unit_header of 2 bytes may be followed by a PCC header pcc_header of PCC-related three bytes. The PCC header may be defined as in Table 3.

TABLE 3

| | Descriptor |
|---|---|
| If (nal_unit_type == 63) { | |
| pcc_header( ) { | |
| pcc_bitstream_version | 4 |
| enbedded_data_type | 8 |
| frame_counter | 8 |
| reserved_zero_bits | 4 |
| } | |
| } | |

In Table 3, pcc_bitstream_version may indicate a type and a version of a point cloud bitstream. For example, pcc_bitstream_version may indicate whether the point cloud bitstream is based on TMC1 or TMC2 (assuming merging of 1 and 3). In this case, a pcc_bitstream_version field may be divided as one bit for a type and three bits for a version.

In Table 3, an embedded_data_type field may be used to indicate a type of data embedded in the PCC NAL unit. The data may use one of values of Table 4.

TABLE 4

| embedded_data_type | Name of embedded data type | Content of embedded data | Class of embedded data |
|---|---|---|---|
| 0 | Geometry | The embedded data is part of the HEVC compressed geometry bitstream. | VCL |
| 1 | Texture | The embedded data is part of the HEVC compressed texture bitstream. | VCL |
| 2 | Compressed occupancy map | The embedded data is part of the occupancy map. | VCL |
| 3 | Compressed auxiliary patch information Compressed combined occupancy map + auxiliary patch information | The embedded data is part of the auxiliary patch information. | VCL |
| 4 | Geometry + Auxiliary | The embedded data carries geometry information together with associated auxiliary patch information that pertains to the embedded geometry information | VCL |
| 5 . . . 19 | Reserved | These codes are reserved for future usage. | |
| 20 | PCC Header Parameter Set | Information from the stream header. | Non-VCL |
| 21 | PCC Frame Parameter Set | The embedded data consists of information relative to one PCC frame. | |

In Table 4, frame_counter may be used to uniquely associate each PCC unit with one frame. frame_counter may sequentially increase with respect to all frames having at least one PCC data component.

According to an embodiment, an NAL unit may be assumed to a VCL embedded data unit. For a component of a PCC stream compressed using HEVC (geometry and texture data), an HEVC NAL unit may be encapsulated into a PCC NAL unit. In this case, the PCC NAL unit may include at least one HEVC NAL unit. However, the HEVC NAL unit including geometry and texture data should not be carried in the same PCC NAL unit. That is, the PCC NAL unit has to deliver only geometry information or color information. The auxiliary patch information may be carried together with related geometry information.

frame_counter may be incremented by one for each PCC access unit. When the PCC access unit is a random access unit, frame_counter may be reset to 0. frame_counter needs to be less than max_frame_counter calculated as in Equation 1.

max_frame_counter=max(MaxPicOrderCntLsb_geometry»1, MaxPicOrderCntLsb_texture»1)   Equation 1

For another VCL component of a PCC stream compressed using other methods than HEVC, an RBSP format for a corresponding VCL embedded_data_type will be referred to.

As one example, a PCC technique may be determined to code various geometry or texture data by using another coding scheme in place of a multi-layer interleaving HEVC scheme. In this case, a reserved value for embedded_data_type may be set to indicate a particular layer of geometry or texture data.

According to another embodiment, an NAL unit may be assumed to a non-VCL embedded data unit. In this case, PCC header information may be used to initialize a PCC decoder and follow the format of Table 5.

TABLE 5

```
pcc_header_nal {
  header_id
  max_frame_counter
  color_transform color_transform
  min_image_width min_image_width
  min_image_height min_image_height
    surface_thickness
    occupancy_resolution
    radius_to_smoothing
    neighbor_count_smaothing
    radius_to_boundary_detection
    threshold_smoothing
}
```

A contents consuming apparatus according to an embodiment may perform the following procedure:

1. define arrival time and removal time of a DFB for geometry data, texture data, occupancy (map) information, and auxiliary patch information, and designate parameters for determining the arrival time and the removal time;

2. define an arrival time and a separation time of a manipulation DFB for geometry data, texture data, occupancy (map) information, and auxiliary patch information, and designate parameters for determining the arrival time and the removal) time;

3. define an arrival time and a removal time of a reconstructed frame buffer (RFB) for geometry and designate parameters for determining the arrival time and the removal time;

4. define an arrival time and a removal time of an RFB for texture and designate parameters for determining the arrival time and the removal time;

5. define an arrival time and a removal time of an RFB for PC and designate parameters for determining the arrival time and the removal time; and 6. Define level and profile parameters such as the number of points, a point distance, etc.

Meanwhile, a detailed embodiment has been provided in the detailed description of the present disclosure, but those of ordinary skill in the art may also carry out various modifications without departing from the range of various embodiments proposed in the present disclosure. Therefore, the scope of the present disclosure should be defined by the appended claims and equivalents thereof, rather than by the described embodiments. Moreover, such modified embodiments should not be understood separately from the technical spirit or prospect of the present disclosure.

The invention claimed is:

1. A method for processing point cloud data in an electronic device, the method comprising:
   generating a bitstream according to point cloud compression (PCC);
   dividing the bitstream into a plurality of type-specific data components; and
   generating a plurality of access units (AUs) based on the plurality of type-specific data components by encapsulating the plurality of type-specific data components into a network abstraction layer, NAL, unit, included in a payload of the AU,
   wherein the plurality of type-specific data components comprise at least one layer-specific geometry data, at least one layer-specific texture data, auxiliary patch information, and occupancy (map) information,
   wherein the each of the plurality of AUs comprises a header and a payload, and
   wherein a size of each of the plurality of AUs matches a maximum transmission unit (MTU) in a network.

2. The method of claim 1, wherein the header comprises information about a type of a data component included in the payload of the AU and an identifier of a PCC frame to which the AU is applicable.

3. The method of claim 2, wherein the header further comprises information about a coding type applied to the data component included in the payload of the AU and one or a plurality of tool parameters.

4. The method of claim 1, further comprising interleaving the plurality of AUs.

5. The method of claim 1, wherein the data component included in the payload of the each of the plurality of AUs is identified by explicit signaling.

6. The method of claim 1, wherein a coding type applied to the at least one layer-specific geometry data and the at least one layer-specific texture data is a video coding scheme, and a coding type applied to the auxiliary patch information is an arithmetic coding scheme.

7. The method of claim 1, further comprising generating an AU based on meta data regarding the plurality of type-specific data components.

8. An electronic device for processing point cloud data, the electronic device comprising:
   a transceiver; and
   at least one processor connected to the transceiver,
   wherein the at least one processor is configured to:
      generate a bitstream according to point cloud compression (PCC), and
      dividing the bitstream into a plurality of type-specific data components, and
      generate a plurality of access units (AUs) based on the plurality of type-specific data components by encapsulating the plurality of type-specific data components into a network abstraction layer, NAL, unit, included in a payload of the AU,
   wherein the plurality of type-specific data components comprise at least one layer-specific geometry data, at least one layer-specific texture data, auxiliary patch information, and occupancy (map) information,
   wherein the each of the plurality of AUs comprises a header and a payload, and
   wherein a size of each of the plurality of AUs matches a maximum transmission unit (MTU) in a network.

9. The electronic device of claim 8, wherein the header comprises information about a type of a data component included in the payload of the AU and an identifier of a PCC frame to which the AU is applicable.

10. The electronic device of claim 9, wherein the header further comprises information about a coding type applied to the data component included in the payload of the AU and one or a plurality of tool parameters.

11. The electronic device of claim 8, further comprising an interleaver configured to interleave the plurality of AUs.

12. The electronic device of claim 8, wherein the data component included in the payload of the each of the plurality of AUs is identified by explicit signaling.

13. The electronic device of claim 8, further comprising:
   a first coder configured to code the at least one layer-specific geometry data and the at least one layer-specific texture data using a video coding scheme; and
   a second coder configured to code the auxiliary patch information using an arithmetic coding scheme.

14. The electronic device of claim 8, wherein the at least one processor is configured to generate an AU based on meta data regarding the plurality of type-specific data components.

* * * * *